S. H. LITTLE.

Street-Cars.

No. 5,791. Reissued March 17, 1874.

WITNESSES:

Robert Burns

Walter Allen

INVENTOR:

Samuel H. Little

By Wright Bros Attorneys.

AM. PHOTO-LITHOGRAPHIC Co. N.Y. (OSBORNE'S PROCESS.)

UNITED STATES PATENT OFFICE.

SAMUEL H. LITTLE, OF ROSEMOND, ILLINOIS.

IMPROVEMENT IN STREET-CARS.

Specification forming part of Letters Patent No. 140,052, dated June 17, 1873; reissue No. 5,791, dated March 17, 1874; application filed December 23, 1873.

DIVISION A.

*To all whom it may concern:*

Be it known that I, SAMUEL H. LITTLE, of Rosemond, Christian county, Illinois, have invented a certain Improvement in Street-Railway Cars, of which the following is a specification:

My invention relates to devices by which the driver is enabled to open and shut the rear sliding door of a street-railway car without leaving his position. The first part of my invention consists in the manner of supporting the rear door of the car. This door rests on pulleys upon a track beneath the floor of the car, so that no dirt will collect upon the track from the feet of the persons entering. The second part of my invention consists in the combination of a sliding door, at the rear of a car, with a continuous cord for operating it, said cord being attached by its ends to a fixture on the door, and passing through suitable guides or sheaves within or beneath the car, and around an external drum or pulley at front. The third part of my invention consists in the combination of a sliding door supported on a track beneath the floor, a continuous cord for operating it, and guide sheaves or pulleys for conducting the said cord.

Figure 1:
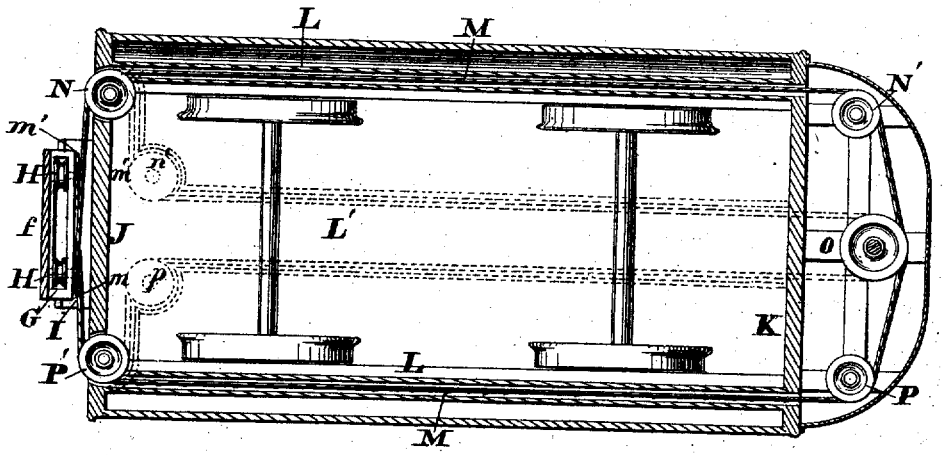
Figure 2:
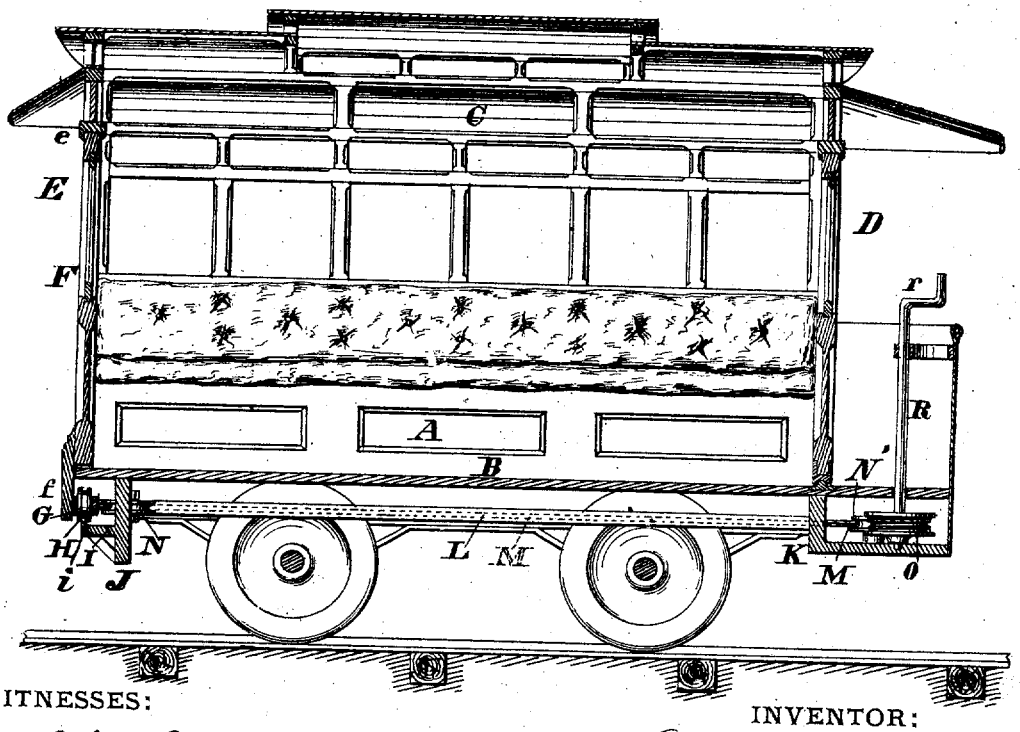

Figure 1 is a horizontal section of the car in the plane of the cord by which the rear door is operated. Fig. 2 is a longitudinal section at the center of the car.

A is the side wall; B, the floor; C, the roof; D, the front end; and E, the rear end. F is the rear door, whose top slides in a groove, *e*. At the bottom of the door is a bracket, *f*, to which is attached a rectangular frame, G, to which the grooved rollers H are journaled. This frame is beneath the floor, and the rollers H travel on a rail, *i*, upon a bracket, I, secured to the cross-timber J, the latter being connected to the cross-timber K (at the front of the car) by trunks or pipes L, forming guides and supports for the cord M. The end *m* of the cord is attached to one end of the frame G, and, passing around the pulleys N N′, it is coiled around the drum O or attached thereto, and from the drum the cord passes around the pulleys P P′, and the end *m′* is attached to the frame G at the opposite end to that *m*, the ends of the cord preferably crossing each other, as shown, in front of the frame G.

Supposing the door to be closed, it is opened by turning the drum J in either direction. The drum is upon a shaft, R, ending above in a hand-crank, *r*, by which the driver turns the drum.

In dotted lines in Fig. 1 is shown a modification, in which a single central trunk, L′, is used in place of the two trunks L L, and the positions of the two pulleys, N′ P, are changed to the positions shown at *n′ p*, the course of the cord being indicated by dotted lines.

I claim as my invention—

1. In a street-railway car, the combination of the sliding door F, bracket *f*, roller-frame G, rollers H, and rail *i*, beneath the floor, all substantially as and for the purpose set forth.

2. The combination of a sliding car-door, a single or continuous cord for operating it, suitable guiding-sheaves or pulleys within or beneath the car, and an external drum or pulley in front.

3. The combination of a sliding car-door, supported on a track beneath the floor, a single continuous cord for operating it, and suitable guiding sheaves or pulleys for the said cord, substantially as set forth.

In testimony of said invention I have hereunto set my hand.

SAMUEL H. LITTLE.

Witnesses:

SAML. KNIGHT,
ROBERT BURNS.